Dec. 24, 1935.  L. P. STUART  2,025,254
WEEDER
Filed June 16, 1933
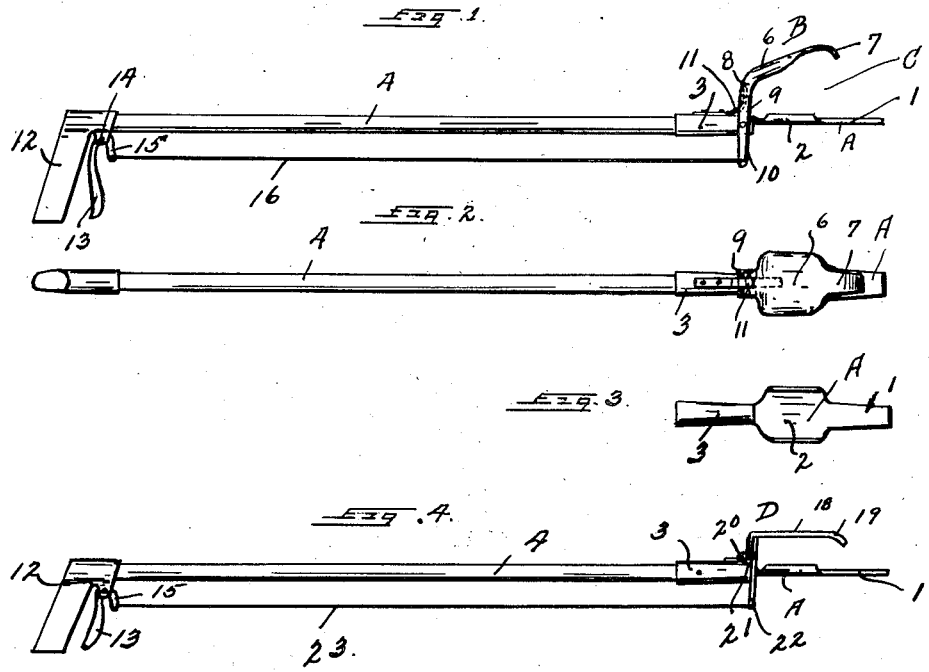
Inventor
Lafayette P. Stuart
By R. M. Thomas
Attorney Patented Dec. 24, 1935

2,025,254

UNITED STATES PATENT OFFICE 2,025,254

WEEDER

Lafayette P. Stuart, Salt Lake City, Utah

Application June 16, 1933, Serial No. 676,048

1 Claim. (Cl. 55—148)

My invention relates to weeders and has for its object to provide a new and efficient weeder or dandelion remover, which will cut off the root of the weed and then lift it from the soil.

A further object is to provide a weeder which will cut the root of the weed and which will then lift the body of the weed, carrying it until sufficient weeds have been collected so that all can be dropped into a container at the same time.

A further object is to provide a weeder which will be economical to manufacture and assemble and which will be simple in its operation so that any one can use it with a few minutes' experience.

A still further object is to provide a weeder which may be used to both dig and collect the weeds and which needs only a slight pressure of the hand to close the weed lifter and catcher to allow each new weed to be engaged therein and having a spring tension to normally hold the weed catcher in the open position.

A still further object is to provide a device for weeding without bending over.

These objects I accomplish with the device illustrated in the accompanying drawing in which similar numerals and letters of reference indicate like parts throughout the several views and as described in the specification forming a part of this application and pointed out in the appended claim.

In the drawing in which I have shown the device

Figure 1 is a side elevation of the weeder.

Figure 2 is a plan view of Figure 1.

Figure 3 is a plan view of the weed cutter blade.

Figure 4 is a side elevation of a modification of the weeder with the holder modified in form.

In the drawing I have shown the device as a weed cutter blade A, having the end 1 tapered and sharpened to cut off the roots of the weeds and having the upper portion 2 of the blade formed broader and joined to a cylinder 3 into which the handle 4 of the device is placed and secured. The weed catcher gripping and lifting blade B is made of a piece of metal having a cup shaped medial portion 6 with one end extended at 7 to form the engaging finger of the lifter and having the other end bent to the body at 8 and bifurcated at 9 to encompass both sides of the cylinder 3 near the blade A. One leg 10 of the lifter B is extended to provide an actuating arm for the lifter and a spring 11 is secured to the cylinder 3 and extended through and under the end of the lifter B between the bifurcated ends thereof to engage within the inner side of the lifter; thus the spring 11 is pressing to hold the lifter B open at all times except when being operated.

Onto the free end of the handle 4, I provide a hand grip 12 which is provided with a lever 13 pivoted thereto by a pin 14 and said lever 13 has a lever 15 formed therewith and a wire or cable 16 connects the lever 15 with the lever 10 of the lifter B on the other end of the handle so that the position of the lifter or catcher may be controlled by the operator from the head of the handle without stooping.

In the modified form of gripping blade shown in Figure 4 the blade 18 is made with the free end 19 curved toward the cutting blade 1. The other end of the blade 18 is bent at right angles thereto and provided with a hinge connection on the end thereof to engage a like hinge connection secured to the handle cylinder 3 by the hinge pin 20. A spring 21 is wound around the hinge pin and engages the blade 18 to normally hold the blade 18 away from engagement with the cutting blade 1. An arm 22 is secured to the blade 18 extending beyond the back side of the cutting blade and a wire 23 connects this arm with the lever 15 of the hand lever 13 to provide means for actuating the gripping blade of this type of device.

The operation of the device is as follows:

The operator taking the handle in hand, presses the blade end 1 down into the ground at an angle toward the root of the weed and when he has pressed far enough to cut the root he slightly withdraws the blade and presses in on the grip lever 13 which engages the engaging finger 7 of the lifter with the weed and the operator then draws the entire device from the ground holding the weed in the device. With this weed in the device the operator moves the blade A to the next weed and presses the blade into the ground thereadjacent at the same time releasing the finger 7 and when this weed is cut off he repeats the first operation and the finger 7 grips the two weeds and this operation may be continued until the bowl C between the weed lifter and the enlarged body A is filled with weeds. The hand lever 13 is then released and all weeds released simultaneously.

Having thus described my invention I desire to secure by Letters Patent and claim:

In a weed cutter and carrier of the class described the combination of a cutting blade having the cutting end narrow and sharpened and the medial portion broadened and slightly curved and the upper handle engaging end formed cylindrical to receive a handle; a handle to be secured in said cylindrical end; a gripping blade pivotally secured to the cylindrical portion of the cutting blade with the medial portion of the gripping blade formed cup shaped to receive the weeds; a spring to normally hold the gripping blade away from the cutting blade; a hand grip on the end of said handle; a lever pivoted to said hand grip; and a wire connecting said lever with an extended arm on the gripping blade to actuate the gripping blade from the end of the handle.

LAFAYETTE P. STUART.